United States Patent
Kashiwase et al.

(10) Patent No.: US 7,062,955 B2
(45) Date of Patent: Jun. 20, 2006

(54) COMBUSTION-PRESSURE-DATA ACQUISITION SYSTEM OF MULTI-CYLINDER ENGINE

(75) Inventors: Hajime Kashiwase, Tokyo (JP);
Hiromichi Watanabe, Tokyo (JP);
Hiroshi Yokoyama, Saitama (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/249,110

(22) Filed: Oct. 11, 2005

(65) Prior Publication Data
US 2006/0032291 A1   Feb. 16, 2006

Related U.S. Application Data

(63) Continuation of application No. PCT/JP2004/005685, filed on Apr. 21, 2004.

(30) Foreign Application Priority Data
Apr. 21, 2003   (JP) ............................. 2003-116073

(51) Int. Cl.
*G01M 15/00* (2006.01)
(52) U.S. Cl. ...................................... 73/115
(58) Field of Classification Search .................. 73/112, 73/115, 116, 117.2, 117.3, 118.1
See application file for complete search history.

(56) References Cited

U.S. PATENT DOCUMENTS

| | | | | |
|---|---|---|---|---|
| 4,690,116 A | * | 9/1987 | Takahashi | 123/406.16 |
| 4,821,194 A | * | 4/1989 | Kawamura | 701/111 |
| 5,076,098 A | | 12/1991 | Miwa | |
| 6,776,032 B1 | * | 8/2004 | Matsui et al. | 73/117.3 |
| 2004/0183398 A1 | * | 9/2004 | Kashiwase et al. | 310/319 |
| 2005/0061296 A1 | * | 3/2005 | Kashiwase et al. | 123/435 |

FOREIGN PATENT DOCUMENTS

| | | |
|---|---|---|
| JP | 63-44133 U | 3/1988 |
| JP | 63-98535 A | 4/1988 |
| JP | 3-246327 A | 11/1991 |
| JP | 3-246350 A | 11/1991 |
| JP | 3-246352 A | 11/1991 |
| JP | 5-172679 B2 | 7/1993 |
| JP | 7-280686 A | 10/1995 |
| JP | 2000-45857 A | 2/2000 |

* cited by examiner

*Primary Examiner*—Eric S. McCall
(74) *Attorney, Agent, or Firm*—Darby & Darby

(57) ABSTRACT

A combustion-pressure-data acquisition system of a multi-cylinder engine according to the present invention includes an in-cylinder pressure sensor CPS#n for directly detecting combustion pressure in each cylinder; an amplifier unit AP#n to which the in-cylinder pressure sensor CPS#n for each cylinder is connected; and a channel switching unit MUX to which the amplifier unit AP#n for each cylinder is connected. It selects a system to be measured from among a plurality of systems of signals from the amplifier units AP#n with a channel selection signal outputted from an engine-controlling electronic control unit and outputs combustion pressure data to the ECU. Further, it outputs to an amplifier unit AP#n with which measurement ends a reset signal for discharging the electric charge between the in-cylinder pressure sensor CPS#n and the amplifier circuit to efficiently acquire combustion pressure data of each cylinder with a simple structure without complicated processing.

2 Claims, 5 Drawing Sheets

COMBUSTION-PRESSURE-DATA ACQUISITION SYSTEM OF MULTI-CYLINDER ENGINE

CROSS REFERENCE TO RELATED APPLICATION

This application is a continuation application of PCT/JP2004/005685 filed on Apr. 21, 2004 and claims the benefit of Japanese Application No. 2003-116073 filed in Japan on Apr. 21, 2003, the entire contents of each of which are incorporated herein by their reference.

BACKGROUND OF THE INVENTION

1. Field of the Invention

The present invention relates to a combustion-pressure-data acquisition system of multi-cylinder engines for acquiring combustion pressure data of each cylinder by measuring the combustion pressure of the cylinder.

2. Description of the Related Art

Today, as global environmental protection measures, there are demands for improving combustion efficiency for CO2 reduction and reduced harmful exhaust emission in association with internal combustion engines including automobile engines. On the other hand, especially automobile engines are used in a wide range of engine revolutions and load conditions such as from an engine starting, an idling state, traveling at a low, medium to high speed. It is necessary to take environmental protection measures in all the states. Therefore, engine control needs to be optimized taking all the states into consideration. As means for confirming whether engine control for this purpose is appropriate, typical technology for using sensors for measuring a combustion state of the engine and measuring and analyzing changes in combustion gas pressure to optimize engine control has been developed.

More specifically, combustion gas pressure can always be corrected to an optimal value by measuring the combustion pressure in each cylinder and automatically carrying out optimal control of the engine in an engine control system, and control according to different engine operating conditions can be performed. Furthermore, optimal control is always ensured according to variations in individual engines or cylinders or performance changes due to deterioration of parts over time resulting from operating the engine, thus enabling combustion efficiency to be improved for CO2 reduction and harmful exhaust emission to be reduced.

As a sensor for measuring combustion pressure, for example, a pressure sensor (in-cylinder pressure sensor) adopting a piezoelectric element is typically used as disclosed in U.S. Pat. No. 3,123,798. A charge-sensitive amplifier is typically used as an amplifier circuit for converting an electric-charge signal generated in the piezoelectric element into a voltage signal to make it an input signal for engine control.

Here, in order to take full advantage of the engine performance in a multi-cylinder engine for the improvement of combustion efficiency leading to CO2 reduction and reduced harmful exhaust emission, each cylinder is preferably provided with an in-cylinder pressure sensor for measuring combustion pressure to measure the combustion pressure in each cylinder every cycle, so that each cylinder is optimally controlled.

However, when output signals from in-cylinder pressure sensors mounted on all cylinders are to be measured, changes in output signals caused by leak of electric charge between piezoelectric elements and charge-sensitive amplifiers, differences in individual in-cylinder pressure sensors, and temperature changes must be taken into consideration. These considerations not only are burdensome to the engine control apparatus, but cause the control apparatus to become more complicated and larger. They further pose a problem of matching between the pressure sensors and the engine control apparatus and the number of connections between the in-cylinder pressure sensors and the engine control apparatus to increase. In other words, since the handling of a typical in-cylinder pressure sensor for measuring combustion pressure is complicated due to the structure including a circuit and control, there is a problem that a significant increase in cost results in order to take advantage of it together with the main body of the in-cylinder pressure sensor.

The present invention has been conceived in light of these circumstances, and it is an object of the present invention to provide a combustion-pressure-data acquisition system of a multi-cylinder engine for efficiently acquiring combustion pressure data of each cylinder with a simple structure without complicated processing.

SUMMARY OF THE INVENTION

A combustion-pressure-data acquisition system of a multi-cylinder engine according to the present invention includes: an in-cylinder pressure sensor, provided for each cylinder, for outputting an electric-charge signal according to pressure in the-cylinder; an amplifier circuit, provided for each cylinder, being connected to the in-cylinder pressure sensor, for converting the electric-charge signal from the in-cylinder pressure sensor into a voltage signal and outputting the voltage signal, having a reset function for discharging an electric charge with an externally input reset signal; and a switching circuit for selecting a system to be measured from among output signals of the amplifier circuits for the cylinders with a signal based on an engine cylinder determination result to output combustion pressure data and for outputting the reset signal to an amplifier circuit of a system with which measurement ends.

BRIEF DESCRIPTION OF THE DRAWINGS

FIG. 1 is a block diagram of a combustion-pressure-data acquisition system. FIG. 2 is a circuit block diagram of an amplifier unit. FIG. 3 is a circuit block diagram of a channel switching unit. FIG. 4 is a time chart illustrating a channel selection signal, combustion-pressure-data selection timing, and reset signal transmission timing. FIG. 5 is a time chart illustrating combustion-pressure-data switching time.

DESCRIPTION OF THE PREFERRED EMBODIMENTS

Embodiments of the present invention will now be described with reference to the attached drawings.

Figure 1:
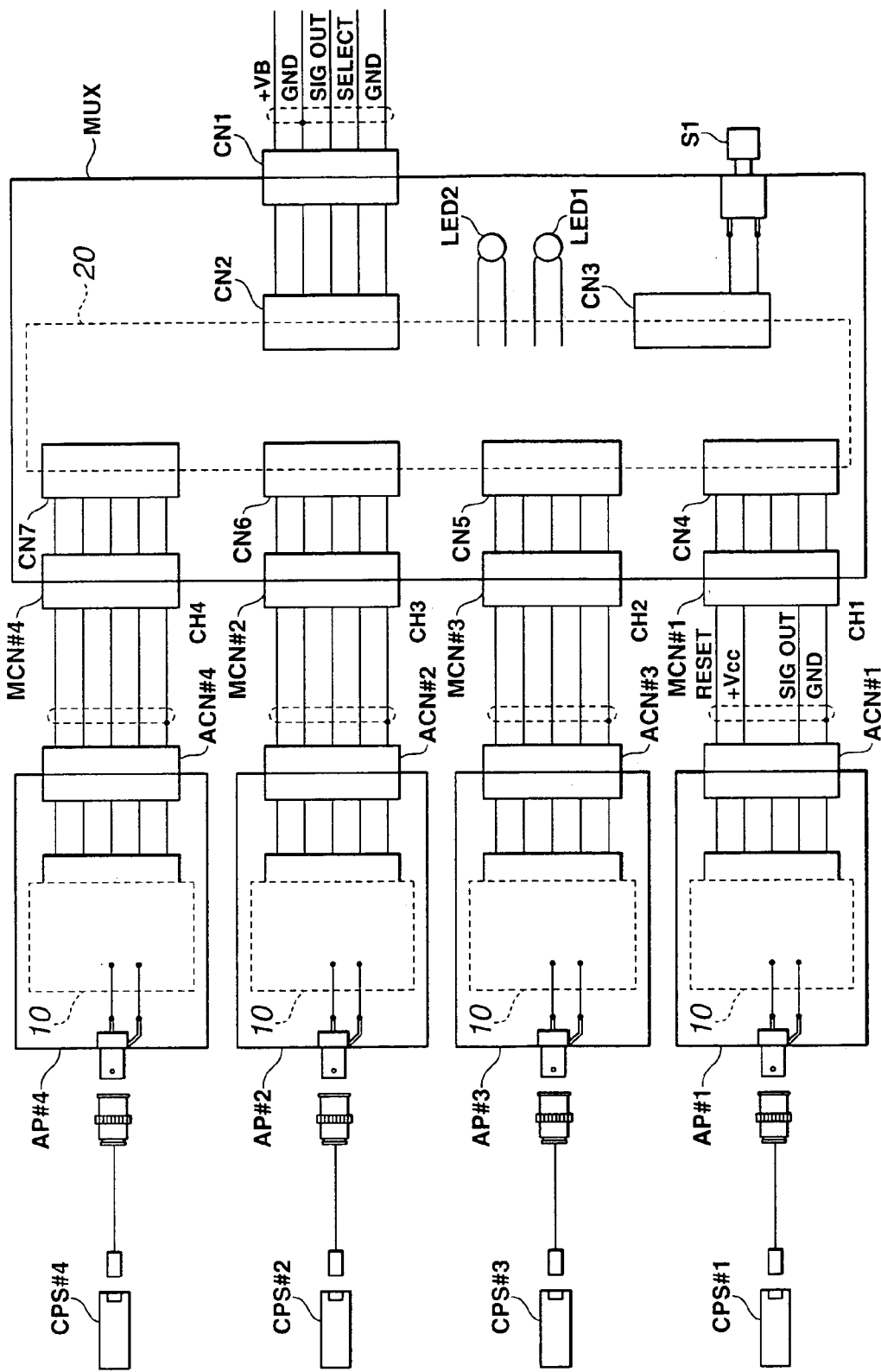
FIGS. 1 to 5 relate to one embodiment according to the present invention.

A combustion-pressure-data acquisition system shown in FIG. 1 is an example applied to a four-cylinder engine, and operates with a single power supply by a car-mounted battery. The combustion-pressure-data acquisition system includes in-cylinder pressure sensors CPS#n (n=1, 2, 3, 4; hereinafter, subscript #n represents the cylinder number) arranged for cylinders of the engine to directly detect the combustion pressure in the cylinders; amplifier units AP#n for amplifying signals from the in-cylinder pressure sensors CPS#n; and a channel switching unit MUX for selecting a system to be measured from among a plurality of systems of signals from the amplifier units AP#n using a channel selection signal of predetermined pulse sequences outputted in synchronization with engine revolutions from an engine-controlling electronic control unit (ECU), not shown in the figure, to output combustion pressure data to the ECU and for outputting a reset signal, to be described below, to the amplifier unit AP#n with which measurement ends.

The in-cylinder pressure sensor CPS#n of each cylinder is connected to the corresponding amplifier unit AP#n. For each amplifier unit AP#n, an external connector ACN#n is connected to an external connector MCN#n of each data selection channel of the channel switching unit MUX. Further, the channel switching unit MUX is connected to the ECU, not shown in the figure, via an external connector CN1.

In this embodiment, the firing order of the engine is assumed to be #1 cylinder→#3 cylinder→#2 cylinder→#4 cylinder. In accordance with the firing order, it is assumed that a channel CH1 corresponds to the #1 cylinder, channel CH2 corresponds to the #3 cylinder, channel CH3 corresponds to the #2 cylinder, and channel CH4 corresponds to the #4 cylinder for the data selection channel.

Therefore, the input/output of the external connector MCN#1 of the channel switching unit MUX connected to the in-cylinder pressure sensor CPS#1 of the #1 cylinder and the amplifier unit AP#1 corresponds to the channel CH1; the input/output of the external connector MCN#2 of the channel switching unit MUX connected to the in-cylinder pressure sensor CPS#2 of the #2 cylinder and the amplifier unit AP#2 corresponds to the channel CH3; the input/output of the external connector MCN#3 of the channel switching unit MUX connected to the in-cylinder pressure sensor CPS#3 of the #3 cylinder and the amplifier unit AP#3 corresponds to the channel CH2; and the input/output of the external connector MCN#4 of the channel switching unit MUX connected to the in-cylinder pressure sensor CPS#4 of the #4 cylinder and the amplifier unit AP#4 corresponds to the channel CH4.

The in-cylinder pressure sensors CPS#n in the embodiment are sensors using piezoelectric elements and generate electric charges in proportion to pressure. For this reason, an amplifier circuit 10 incorporated in each amplifier unit AP#n is a charge-to-voltage conversion amplifier for converting an electric-charge signal into a voltage. It includes an automatic correcting function for correcting a zero-point offset due to leak of an electric charge by automatically correcting such that the output level of the amplifier circuit 10 is the same between the start and the end of generation of an electric charge in the in-cylinder pressure sensor CPS#n; and a forced reset function for forcibly discharging the electric charge at the input side of the amplifier circuit 10 with the reset signal from the channel switching unit MUX.

Figure 2:
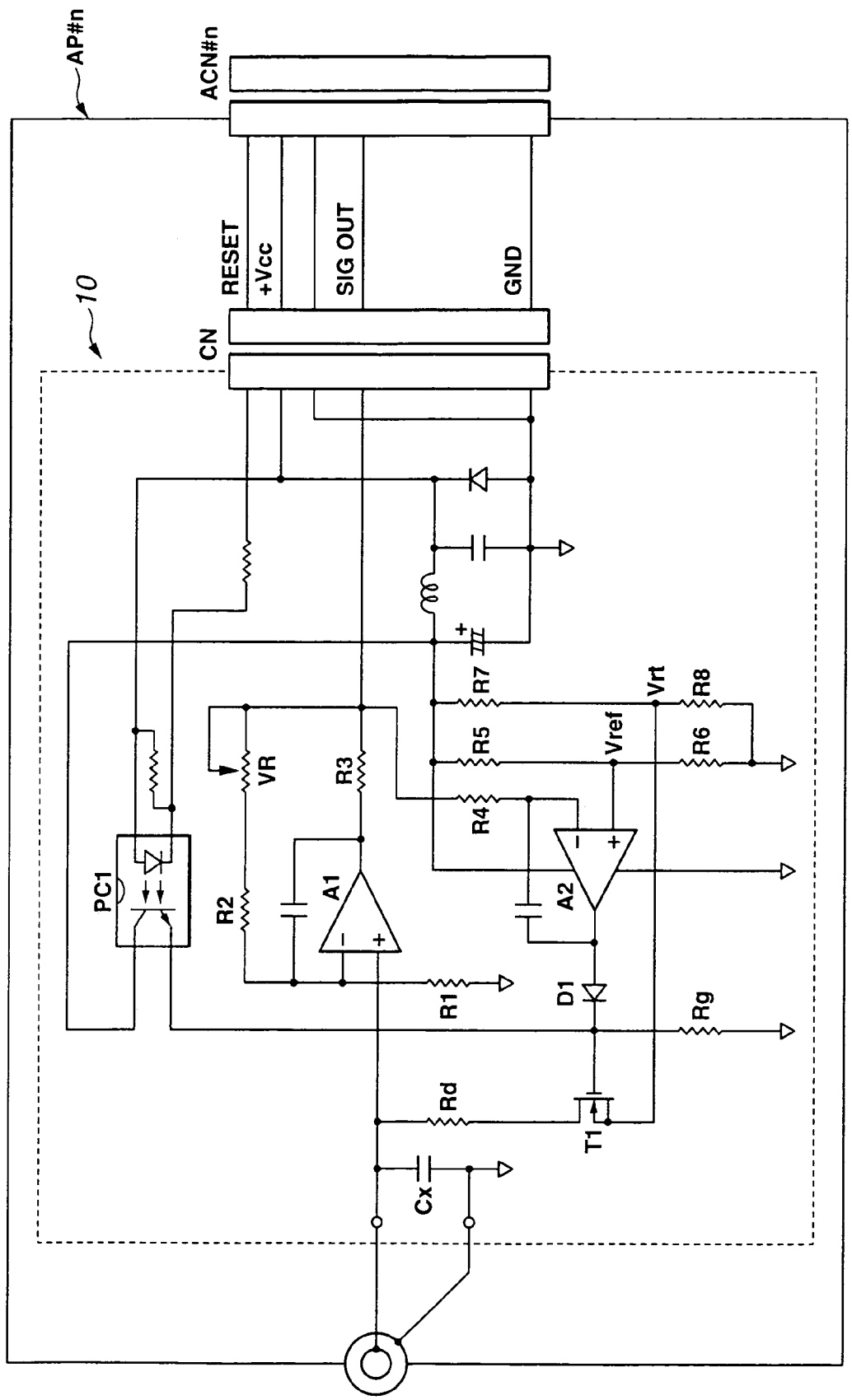

FIG. 2 shows an example circuit of the amplifier circuit 10, which mainly includes a voltage-converting capacitor Cx for storing an electric charge generated in the in-cylinder pressure sensor CPS#n; an amplifier A1 for amplifying the voltage of the voltage-converting capacitor Cx and outputting the voltage; an amplifier A2 and a field effect transistor T1 for detecting a negative output (output equal to or smaller than "0") from the amplifier A1 to perform automatic correction such that the input of the amplifier A1 is "0"; and a photocoupler PC1 for forcibly turning ON the field effect transistor T1 with the reset signal inputted from the channel switching unit MUX to discharge the electric charge at the input side of the amplifier A1.

In short, the output side of the in-cylinder pressure sensor CPS#n is connected such that a generated electric charge is stored in the voltage-converting capacitor Cx of the amplifier circuit 10, and is connected to the non-inverting input terminal of the amplifier A1. The output terminal of the amplifier A1 is branched off three lines via a resistor R3. One line is connected directly to a substrate connector CN and is further connected to the channel switching unit MUX from the substrate connector CN through the external connector ACN#n. Another line is connected to the inverting input terminal of the amplifier A2 via a resistor R4. The remaining line is connected to the inverting input terminal of the amplifier A1 via resistors VR and R2 for gain setting of the amplifier A1, and is grounded via a resistor R1.

The amplifier A2 is an inverting amplifier for detecting a negative output from the amplifier A1, its inverting input terminal is connected to the output terminal of the amplifier A1 via the resistors R3 and R4, and a reference voltage Vref (e.g., +2 mV) generated by dividing a circuit voltage Vcc (e.g., +DC5V) with resistors R5 and R6 is applied to the non-inverting input terminal. The reference voltage Vref is a voltage for determining a "0" point in single power supply operation. The amplifier A2 sets the reference voltage Vref to "0" to operate with voltages smaller than the reference voltage Vref as negative voltage and voltages larger than the reference voltage Vref as positive voltage.

Furthermore, the output terminal of the amplifier A2 is connected to the gate of the field effect transistor T1 via a diode D1. In the field effect transistor T1, a gate resistor Rg is connected to the gate, the drain is connected to the non-inverting input terminal of the amplifier A1 via a resistor Rd, and the source is connected to a potential point that determines an input voltage of the amplifier A1 when the forced reset is applied. The potential point is set to a voltage Vrt (e.g., +6 mV) generated by dividing the circuit voltage Vcc with resistors R7 and R8, and is adjusted as required according to the application. Furthermore, the gate of the field effect transistor T1 is connected to the output terminal of the photocoupler PC1, and the input terminal of the photocoupler PC1 is connected to the substrate connector CN which leads to the channel switching unit MUX via the external connector ACN#n.

On the other hand, as shown in FIG. 1, the channel switching unit MUX includes a switching circuit 20 mainly composed of a multiplexer; two light emitting diodes LED1 and LED2 for displaying in 2 bits a channel switching state by the switching circuit 20 through flashing on and off; and a switch S1 for enabling switching of an amplifier output through manual operation in case of inspection/adjustment and the like. The switching circuit 20 is connected to the external connector CN1 via a substrate connector CN2, is connected to the switch S1 via a substrate connector CN3, and is further connected to the external connectors MCN#1 to MCN#4 via substrate connectors CN4 to CN7.

Figure 3:
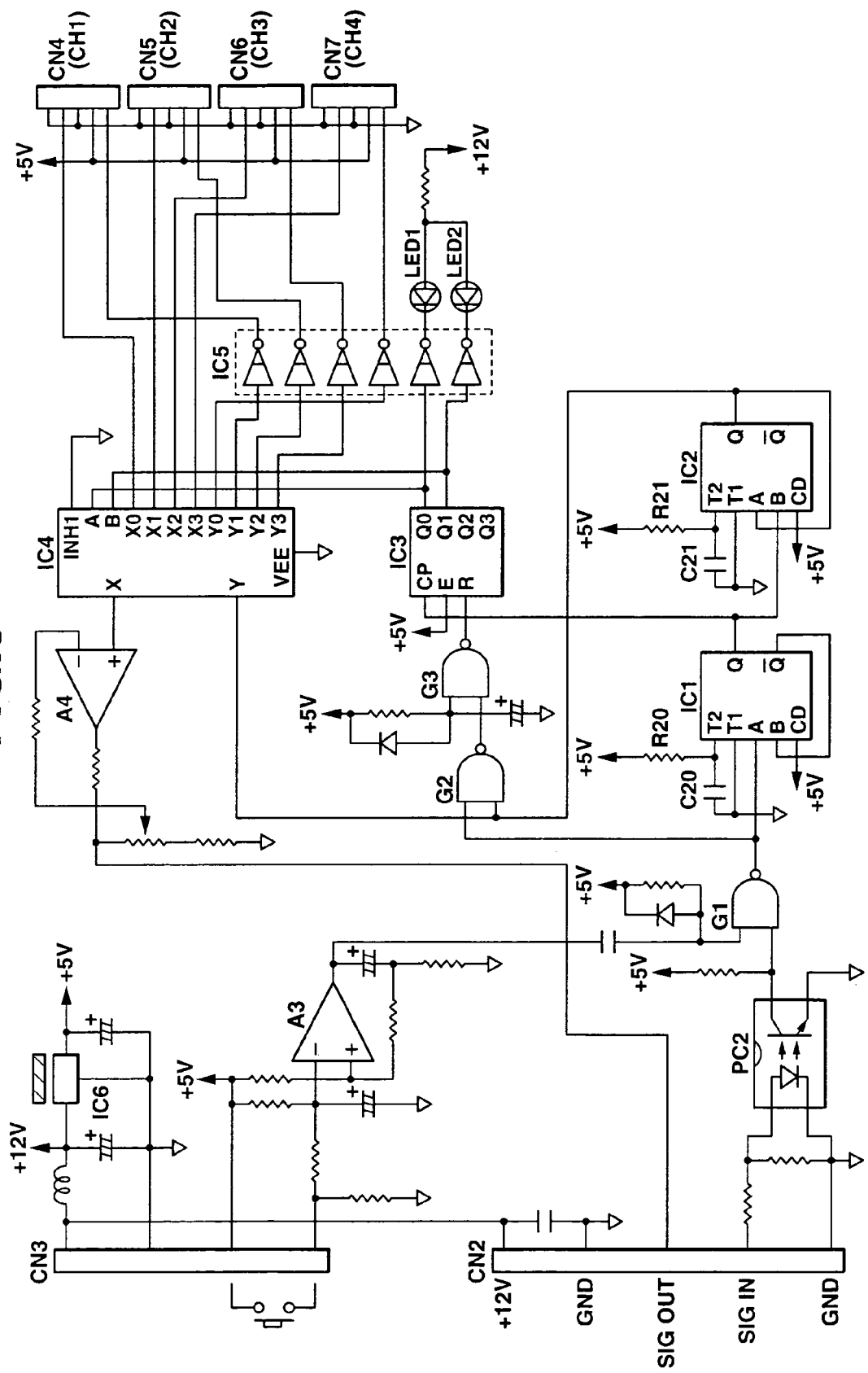

The switching circuit 20, as shown in FIG. 3, includes, as main components, two timers IC1 and IC2 for generating a one-shot pulse for each pulse of the channel selection signal inputted from the ECU; a counter IC3 for counting the channel selection signal to generate address data; and a multiplexer IC4 with two channels (X and Y channels) for switching signals from the amplifier units AP#n according to the address data from the counter IC3 and switching the transmission destination with the output from the timer IC2 as a reset signal.

In detail, the input terminal of a photocoupler PC2 is connected to the channel selection signal input pin of the substrate connector CN2, and the output terminal of the photocoupler PC2 is connected to one input terminal of a two-input NAND gate G1. The output terminal of an amplifier A3 for a Schmitt circuit for forming the waveform of a signal inputted from the switch S1 via the substrate connector CN3 is connected to the other input terminal of the NAND gate G1, and the output terminal of the NAND gate G1 is connected to the trigger input (A input) of the timer IC1 and to one input terminal of a two-input NAND gates G2.

Reference numeral IC6 denotes a three-terminal regulator constituting a power supply circuit. The regulator IC6 drops and stabilizes a battery voltage Vb (12V) supplied via the substrate connector CN3 to generate a circuit power supply +Vcc (5V), which is supplied to each section in the channel switching unit MUX and also to the amplifier units AP#1 to AP#4 connected via the substrate connectors CN4 to CN7 as a power supply.

The Q output of the timer IC1 is connected to the trigger input (B input) of the other timer IC2 and to the clock input (CLK input) terminal of the counter IC3. The Q output of the timer IC2 is connected to the other input terminal of the NAND gate G2 and to the demultiplexing side (Y input) of one channel of the multiplexer IC4. A resistor R20 and a capacitor C20, and a resistor R21 and a capacitor C21 are externally mounted on the timers IC1 and IC2, respectively, such that a pulse width set in relation to the channel selection signal from the ECU is achieved. The timer IC1 outputs a one-shot pulse having the set pulse width with a leading edge of the output of the NAND gate G1 as a trigger. The timer IC2 outputs a one-shot pulse having a shorter pulse width than the one-shot pulse of the timer IC1 with a fall of the one-shot pulse of the timer IC1 as a trigger. The relationships among the one-shot pulse of the timer IC1, the one-shot pulse of the timer IC2, and the channel selection signal from the ECU are described below.

The output terminal of the NAND gate G2 is connected to one input terminal of a two-input NAND gate G3 having the other input terminal fixed to a logical level "1" (i.e., inverter). The output terminal of this NAND gate G3 is connected to the reset input (R input) terminal of the counter IC3. In the figure, the counter IC3 makes a quaternary counter using the low-order outputs (Q0, Q1) of a hexadecimal counter, and is counted up on every pulse of the channel selection signal. The low-order outputs Q0 and Q1 of the counter IC3 are connected to the control inputs (A and B input) terminals of the multiplexer IC4, and are further connected to the LED1 and LED2 via the driver amplifier array IC5.

In this embodiment, the multiplexer IC4 is an analog multiplexer with 2 channels, and switches the internal switch with the output data of the counter IC3 as an address. One channel uses multiplexing sides X0, X1, X2, and X3 as input terminals and a demultiplexing side X as an output terminal. The input terminals X0, X1, X2, and X3 are connected to the amplifier output terminals of the amplifier units AP#1 to AP#4 via the substrate connectors CN4 to CN7, respectively. The output terminal X is connected to the amplifier signal output pin of the substrate connector CN2 via an amplifying amplifier A4.

The other channel uses multiplexing sides Y0, Y1, Y2, and Y3 as output terminals and a demultiplexing side Y as an input terminal. The output terminals Y0, Y1, Y2, and Y3 are connected to the reset signal input terminals of the amplifier units AP#1 to AP#4, respectively, via a driver amplifier array IC5 and the substrate connectors CN4 to CN7, and switches the transmission destination with the output data of the counter IC3 with the Q output of the timer IC2 to the input terminal Y as a reset signal.

In the combustion-pressure-data acquisition system with the above-described structure, first an electric-charge signal outputted from the in-cylinder pressure sensor CPS#n according to pressure is converted into a voltage signal by the amplifier unit AP#n, and this amplifier output signal converted into a voltage signal is outputted to the channel switching unit MUX.

More specifically, for a typical 4-stroke cycle engine (intake→compressions→combustion→exhaust) in a state where the piston reaches a point near the top dead center, the exhaust valve is closed, and the intake valve is open, the in-cylinder pressure is the atmospheric pressure for a natural aspiration engine and is a pressure generated by adding a boost pressure (e.g., about 66.66 KPa to 199.98 KPa) to the atmospheric pressure for an engine with a supercharger.

At this time, an electric charge in proportion to the pressure load in the cylinder generates in the piezoelectric element of the in-cylinder pressure sensor CPS#n. When the electric charge is represented as q, the electric charge q is stored in the voltage-converting capacitor Cx of the amplifier unit AP#n, is converted into the voltage signal +V by the amplifier A1, and is output. Therefore, with the signal level in a state where the in-cylinder pressure is the atmospheric pressure as a zero level, and the boost pressure added to the atmospheric pressure zero level as a DC voltage component in a case that the boost pressure exists, the added pressure is considered as a basic level of a combustion waveform that rises with a combustion pressure.

While the piston moves from the top dead center towards the bottom dead center, intake continues, and during this period no significant changes are seen in the in-cylinder pressure, maintained at the substantially basic level. Next, when compression starts during the period from the bottom dead center to the top dead center after the piston reaches a point near the bottom dead center and the intake valve is closed, the in-cylinder pressure starts to increase with this start of compression, the electric charge of the piezoelectric element increases and is sequentially accumulated in the voltage-converting capacitor Cx, and the voltage signal +V converted/outputted in the amplifier A1 also increases.

Then, combustion pressure generates by firing just before the top dead center is reached (just before the compression pressure reaches the maximum value), the generated combustion pressure causes the electric charge of the piezoelectric element to significantly increase, and the voltage signal +V converted/outputted by the amplifier A1 also rapidly increases. At this time, a signal outputted as a combustion pressure is a signal from the above-described basic level, i.e., a signal from the level of the atmospheric pressure for the natural aspiration engine, and a signal superimposed on the DC voltage component of the boost pressure for the engine with a supercharger.

Next, when the piston moves from the top dead center towards the bottom dead center after the in-cylinder pressure has reached the maximum, and accordingly the pressure in the cylinder starts to decrease, the electric charge inverts the polarity to −q and feeds back from the voltage-converting capacitor Cx to the piezoelectric element, and the voltage signal +V converted/outputted by the amplifier A1 also decreases. Thereafter, when the piston reaches a point near the bottom dead center, the exhaust valve opens (the intake valve remains closed), and combustion gas is exhausted in the stroke where the piston moves towards the top dead center, the in-cylinder pressure for the natural aspiration engine returns to the atmospheric pressure and the in-cylinder pressure for the engine with supercharger returns to the boost pressure to complete one combustion cycle, and accordingly the signal levels are also returned to their respective levels before the start of combustion cycle.

This phenomenon is observed from the viewpoint of the output of the amplifier A1. The voltage before pressure is applied to the in-cylinder pressure sensor CPS#n is "0" (Vref; 2 mV). The amplifier A1 outputs a positive voltage as soon as pressure is applied, the output voltage of the amplifier A1 decreases when the pressure starts to decreases, and the electric charge becomes zero if there is no leak of the electric charge, and the output voltage of the amplifier Al also becomes zero.

However, in practice, the insulation resistance of the signal transmission system between the in-cylinder pressure sensor CPS#n and the amplifier unit AP#n is finite, a part of electric charge stored in the voltage-converting capacitor Cx leaks, and the signal outputted as the combustion pressure is superimposed on a signal voltage turned into a negative voltage when a pressure decrease starts and outputted. A signal voltage to return to the level in the beginning when the pressure starts to be applied may enter the negative area. In short, when pressure is increased from zero and is returned to zero again, an electric charge of the in-cylinder pressure sensor CPS#n becomes negative by the amount equivalent to the leak of the electric charge and the zero-point level of the signal outputted from the amplifier unit AP#n varies, possibly preventing correct measurement from being performed.

In response to the leak of the electric charge, when an electric charge leaks back to zero and the amplifier A1 is going to perform negative output, the amplifier unit AP#n detects the negative output of the amplifier A1 as leak of electric charge and the automatic correcting function operates to automatically correct the zero-point offset due to the leak of the electric charge.

In short, the negative voltage of the amplifier A1 is inverted and amplified in the amplifier A2, and the amplified output is added to the gate of the field effect transistor T1. When the gate voltage of the field effect transistor T1 is equal to or below the threshold voltage Vth (about 1 to 3 V), an electric charge is applied to the voltage-converting capacitor Cx through a drain-to-gate capacitance Cdg. When the gate voltage of the field effect transistor T1 exceeds the threshold voltage Vth, the drain-to-source starts to become conductive. Consequently, the electric charge of the sensor is discharged through the field effect transistor T1, and the voltage at the amplifier A1 output terminal becomes "0" (2 mV).

If viewed from the amplifier A1 side, the automatic correcting function by the amplifier A2 and the field effect transistor T1 constitutes a type of negative feedback circuit when the output is negative, applies automatic correction by making the input of the amplifier A1 conductive to the zero point in the field effect transistor T1, subsequently operates with the minimum pressure (including negative pressure) as the zero point when the pressure increases, and continues the state as long as the input of the amplifier A1 is in the negative area.

In a state where the automatic correction functions, a positive voltage is applied to the gate of the field effect transistor T1, balance is achieved at a certain point if the pressure does not change continuously, and the balance state is maintained. Although the balance state is affected by parameters such as the voltage of each section, the gains and offsets of the amplifiers A1 and A2, the threshold voltage Vth of the field effect transistor T1, and the mutual conductance gm, the output of the amplifier A1 is approximately zero.

More specifically, when the gate voltage of the field effect transistor T1 decreases, the electric charge stored in the drain-to-gate capacitance Cdg operates to cause the input voltage of the amplifier A1 to decrease, and consequently operates to cause the gate voltage to increase through the amplifier A1 and the amplifier A2. A case where the gate voltage increases is the same. Therefore, as long as another voltage of the amplifier does not vary, the state is maintained, and when the pressure starts to increase from the state of the minimum pressure, the output of the amplifier A1 turns positive and increases.

Furthermore, when a combustion pressure of the engine is to be measured using the in-cylinder pressure sensor CPS#n, the measurement is performed under extremely temperature changing conditions, and hence temperature changes are superimposed as output, possibly causing a pressure signal to be superimposed on direct current (DC). Therefore, the amplifier unit AP#n eliminates the DC component due to temperature by forced reset discharging the electric charge at the input side of the amplifier A1 with the reset signal sent from the channel switching unit MUX.

More specifically, when the reset signal is inputted from the channel switching unit MUX, the photocoupler PC1 is turned ON and a voltage higher than the threshold voltage Vth is applied to the gate of the field effect transistor T1 to cause the field effect transistor T1 to become conductive. Consequently, the electric charge is discharged regardless of the input state of the sensor signal, the input of the amplifier A1 becomes the voltage Vrt, and the output is a value generated by multiplying the voltage Vrt by the gain of the amplifier A1.

When the reset signal disappears, the gate voltage approaches zero due to the gate resistor Rg, and hence at or below the threshold voltage Vth, the electric charge stored in the drain-to-gate capacitance Cdg is passed to the voltage-converting capacitor Cx, and the input of the amplifier A1 becomes negative. The input voltage of the amplifier A1 at this time is $-Vth \cdot Cdg/(Cs+Cx+Cdg+Cds)$ (where, Cs: floating capacitance by leaked electric charge, Cds: drain-to-source capacitance), the voltage is a sufficient value for automatic correction to operate, and the circuit operates with the point as zero regardless of the input. If pressure decreases, automatic correction functions and operates with the minimum pressure point as zero.

As described above, the amplifier units AP#n have an automatic correcting function for leak of the electric charge and a reset function for temperature changes, a rapid increase in pressure and the subsequent decrease are continuously repeated, and an offset of signal level cumulated every cycle by leak of the electric charge resulting from fast flow-out and flow-in of electric charge in proportion to pressure variations can be corrected. Further, output errors due to temperature changes can be decreased.

Next, the combustion pressure data converted into a voltage signal by the amplifier unit AP#n is switched in the channel switching unit MUX with the channel selection signal sent from the ECU and sent to the ECU. In the channel switching unit MUX, the pulse sequences of the channel selection signal are counted by the counter IC3, and the signal from the amplifier unit AP#n is switched according to the counter value.

Figure 4:
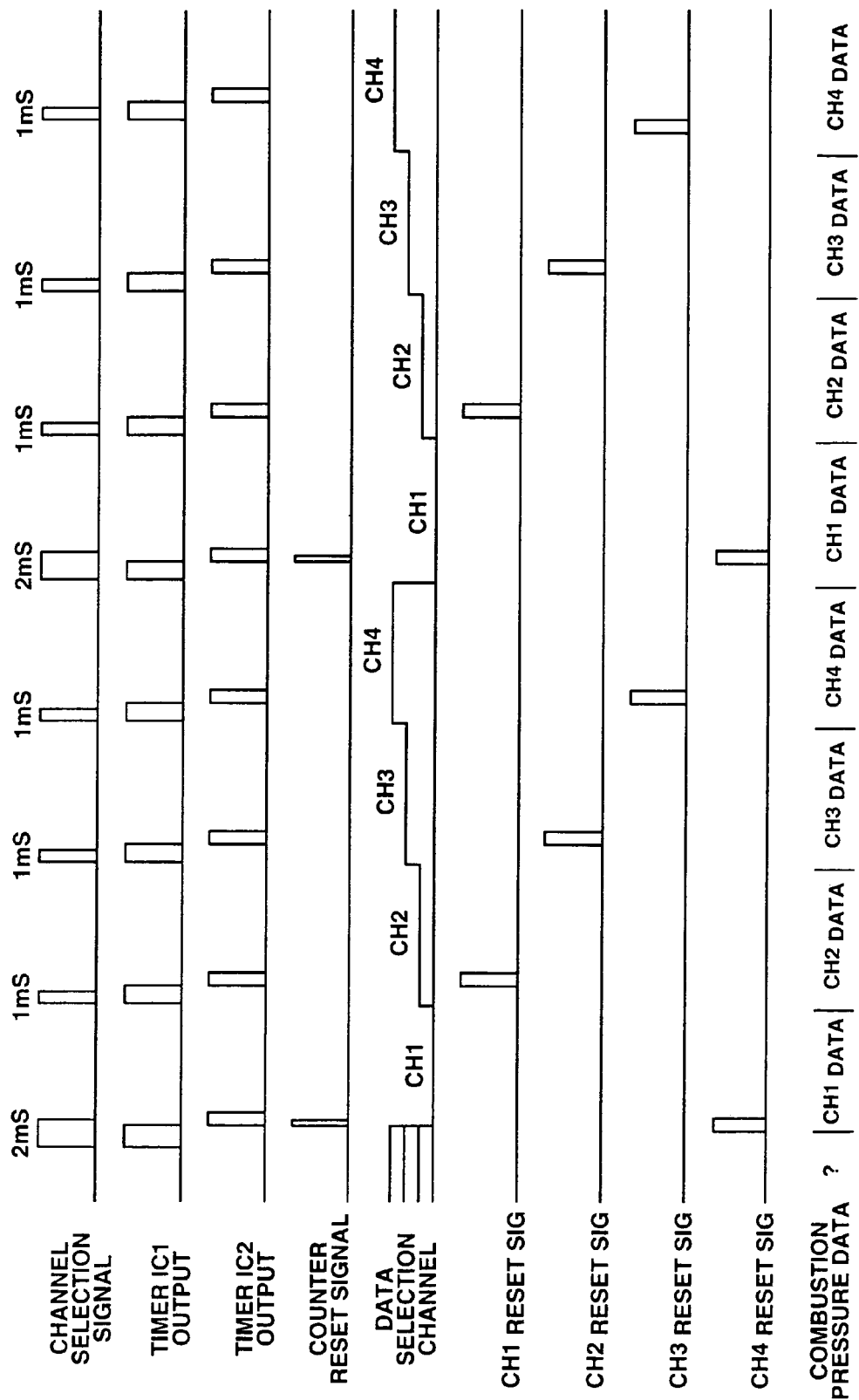
Figure 5:
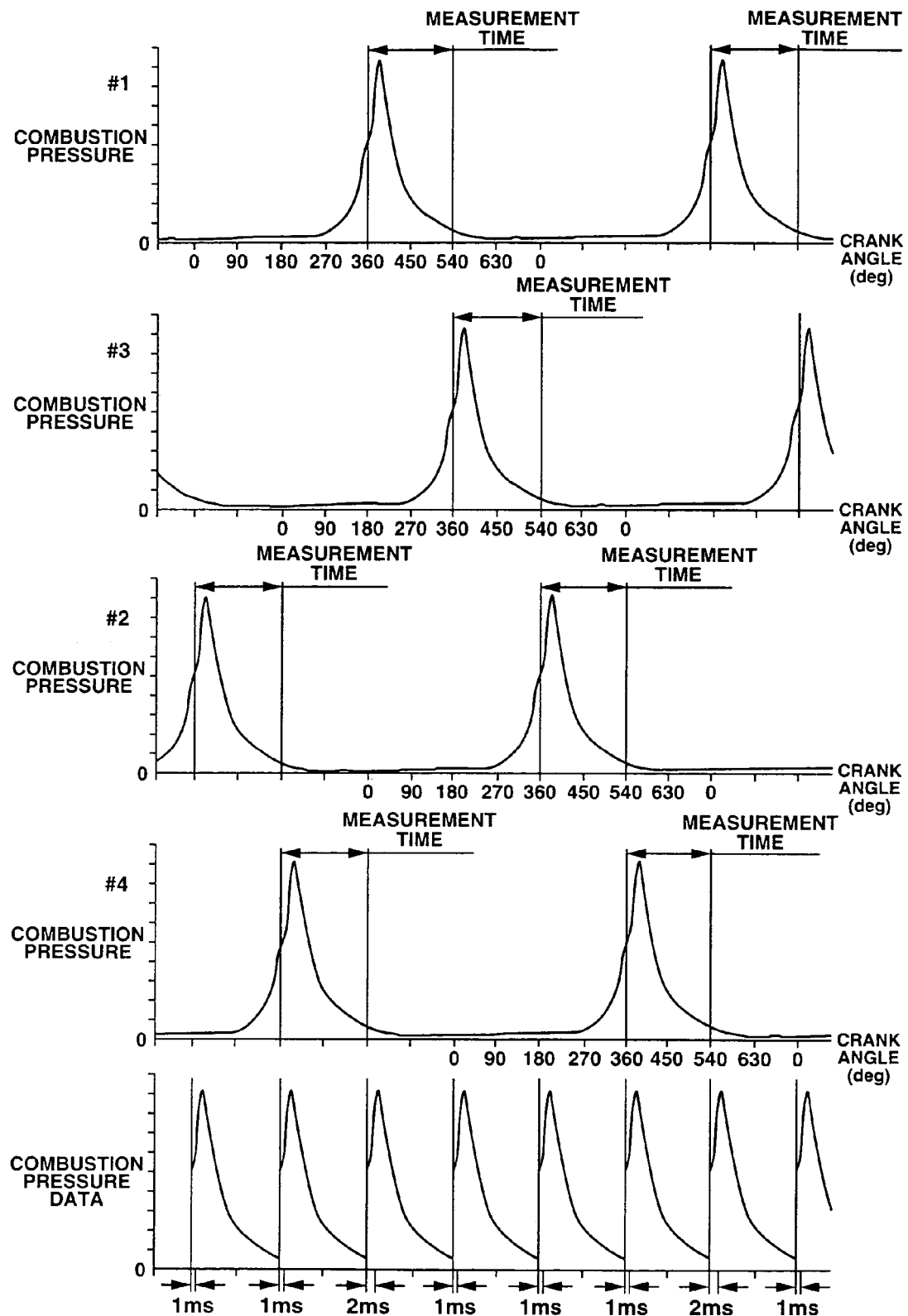

The channel selection signal is a signal output based on a cylinder determination result in the ECU by, for example, a signal outputted from a crank angle sensor and a signal outputted from a cam angle sensor. More specifically, as shown in FIGS. 4 and 5, the channel selection signal is a signal in synchronization with engine revolutions whose one cycle includes a pulse with a pulse width of 2 msec and three pulses with a pulse width of 1 msec following the 2-msec pulse. The 2-msec pulse corresponds to the #1 cylinder and the subsequent three 1-msec pulses correspond to respective cylinders in order of combustion, i.e., in order of the #3 cylinder, #2 cylinder, and #4 cylinder.

In this embodiment, as shown in FIG. 5, the measurement time of combustion pressure of each cylinder is the period of crank angle 180° CA from the compression top dead center to the bottom dead center of each cylinder. The 2-msec pulse is outputted at the compression top dead center of the #1 cylinder, the subsequent 1-msec pulse is outputted at the compression top dead center of the #3 cylinder, the second 1-msec pulse is outputted at the compression top dead center of the #2 cylinder, and the third 1-msec pulse is outputted at the compression top dead center of the #4 cylinder. Measured data from the start to end of combustion of each cylinder is switched in order of combustion and transmitted to the ECU.

For this channel selection signal, the timers IC1 and IC2 in the channel switching unit MUX are set to generate a 1.5-msec one-shot pulse and a 1-msc one-shot pulse, respectively, in order to discriminate between the 2-msec pulse and the 1-msec pulse. Of the pulse sequences of the channel selection signal, each time a pulse with a width longer than 1.5 msec (i.e., 2-msec pulse) is input, the counter IC3 is reset.

In detail, when the channel selection signal is sent to the channel switching unit MUX, it is isolated/inverted in the photocoupler PC2 and inputted to the NAND gate G1, and the same 2-msec pulse is outputted from the NAND gate G1 (here, it is assumed that the manual switching signal by the switch S1 is not inputted). As soon as the 2-msec pulse from this NAND gate G1 is inputted to the NAND gate G2, it is inputted to the timer IC1, which is triggered at a leading edge of the 2-msec pulse.

As a result, as shown in the time chart of FIG. 4, a 1.5-msec pulse is outputted from the timer IC1. This 1.5-msec pulse is inputted to the counter IC3 and counted up, and furthermore, inputted to the timer IC2. The timer IC2 is triggered at a fall of the 1.5-msec pulse from the timer IC1 and outputs a 1-msec pulse. This 1-msec pulse is inputted to the NAND gate G2, and inputted to the Y input terminal of the multiplexer IC4. A logical product between the 2-msec pulse and the 1-msec pulse is outputted to the reset input terminal of the counter C3 from the NAND gate G2 via the NAND gate G3 (functioning as an inverter).

More specifically, a 0.5-msec pulse is generated with the 2-msec pulse of the channel selection signal and the 1-msec pulse from the timer IC2, and is inputted to the counter IC3 as a reset pulse. Therefore, when the 2-msec pulse of the channel selection signal is inputted, the counter IC3 is counted up once and is immediately reset, causing the counter value to be 0.

Similarly in the 1-msec pulse following the 2-msec pulse of the channel selection signal, a 1.5-msec pulse and a 1-msec pulse are outputted from the timers IC1 and IC2, respectively. Since a 1-msec pulse of the channel selection signal and the 1-msec pulse from the timer IC2 are shifted in time, a reset pulse to the counter IC3 is not generated and the counter IC3 is counted up to cause the counter value to become 1. Subsequently, each time a 1-msec pulse of the channel selection signal is inputted, the counter IC3 is counted up, the counter value is incremented and reset with the 2-msec pulse, and the counter value returns to 0.

In other words, if a pulse of the input channel selection signal is longer than 1.5 msec, the counter IC3 is reset, and if it is shorter than 1.5 msec, the counter IC3 is counted up and thereby the counter value (address data) given to the multiplexer IC4 changes.

The multiplexer IC4 switches the X channel to the data selection channel corresponding to the combustion-started cylinder to be measured with the counter value, outputs a signal from the corresponding amplifier unit AP#n to the ECU, switches the Y channel to the data selection channel corresponding to the combustion-ended cylinder with which measurement ends, and sends the 1-msec pulse from the timer IC2 as a reset signal to the corresponding amplifier unit AP#n (refer to the time chart in FIG. 4).

The relationships among the counter value, the data selection channel, the reset signal destination, and the cylinder number are as shown below. Combustion pressure data of the #1 cylinder is selected by the 2-msec pulse input (counter value 0) of the channel selection signal, and the offset of the zero point in the combustion pressure data of the #4 cylinder (combustion cylinder before the #1 cylinder) with which combustion ends is forcibly reset. The combustion pressure data of the #3 cylinder is selected with the subsequent 1-msec pulse input (counter value 1), and the offset of the zero point in the combustion pressure data of the #cylinder (combustion cylinder before the #3 cylinder) with which combustion ends is forcibly reset. Furthermore, the combustion pressure data of the #2 cylinder is selected with the second 1-msec pulse input (counter value 2), and the offset of the zero point in the combustion pressure data of the #3 cylinder (combustion cylinder before the #2 cylinder) with which combustion ends is forcibly reset. The combustion pressure data of the #4 cylinder,is selected with the third 1-msec pulse input (counter value 3), and the offset of the zero point in the combustion pressure data of the #2 cylinder (combustion cylinder before the #4 cylinder) with which combustion ends is forcibly reset. Such a cycle is repeated, and as shown in FIG. 5, the combustion pressure data of the cylinders is sequentially shifted, is transmitted to the ECU as a series of continuous data, and enables optimal combustion control for each cylinder in the ECU.

| Counter value | Data selection channel/ cylinder number | Reset signal destination/ cylinder number |
| --- | --- | --- |
| 0 | CH1/#1 | CH4/#4 |
| 1 | CH2/#3 | CH1/#1 |
| 2 | CH3/#2 | CH2/#3 |
| 3 | CH4/#4 | CH3/#2 |

As described above, according to this embodiment, data obtained by measuring combustion pressure for each cylinder in the multi-cylinder engine can be acquired correctly and efficiently with a simple structure without requiring complicated processing, such as preventive measures against changes etc. in sensor outputs caused-by leak of the electric charge from the sensors, individual differences in the sensors, and temperature changes. This lessens the load on the engine control apparatus. Furthermore, effective utilization is enabled as one continuous input signal through minimum processing regardless of the number of engine cylinders.

This prevents the engine control apparatus from becoming complicated and large, and causes the man-hour for matching the sensors with the control apparatus and the number of connections between the sensors and the control apparatus to be reduced. As a result, an improvement in combustion efficiency for CO2 reduction and optimal control of the engine for reducing harmful exhaust emission can be achieved at low cost.

Although the present invention has been described by way of embodiments, the present invention is not limited to the embodiments. On the contrary, many modifications are conceivable within the spirit of the present invention.

As described above, according to the present invention, combustion pressure data of each cylinder can be efficiently acquired with a simple structure and without requiring complicated processing. This can improve the combustion efficiency, and achieve optimal control of the engine for reduced harmful exhaust emission at low cost.

What is claimed is:

1. A combustion-pressure-data acquisition system of a multi-cylinder engine, comprising:

an in-cylinder pressure sensor, provided for each cylinder, for outputting an electric-charge signal according to pressure in the cylinder;

an amplifier circuit, provided for each cylinder, being connected to the in-cylinder pressure sensor, converting the electric-charge signal from the in-cylinder pressure sensor into a voltage signal and outputting the voltage signal, having a reset function for discharging an electric charge with an externally input reset signal; and a switching circuit for selecting a system to be measured from among output signals of the amplifier circuits for the cylinders with a signal based on an engine cylinder determination result to output combustion pressure data and for outputting the reset signal to an amplifier circuit of a system with which measurement ends.

2. The combustion-pressure-data acquisition system of a multi-cylinder engine according to claim 1, wherein the amplifier circuit includes an automatic correcting function for detecting an amount of leak of an electric charge generated in a signal transmission system and for automatically correcting such that an output level of the. amplifier circuit is the same level between start and end of generation of an electric charge in the in-cylinder pressure sensor.

* * * * *